United States Patent [19]

Hosaka et al.

[11] Patent Number: 4,703,428
[45] Date of Patent: Oct. 27, 1987

[54] POWER TRAIN CONTROL METHOD ON COMMON INPUT DATA

[75] Inventors: Akio Hosaka; Sadao Takase, both of Yokohama, Japan

[73] Assignee: Nissan Motor Co., Ltd., Yokohama, Japan

[21] Appl. No.: 678,885

[22] Filed: Dec. 6, 1984

[30] Foreign Application Priority Data

Dec. 14, 1983 [JP] Japan .................................. 58-234146

[51] Int. Cl.⁴ ......................... B60K 41/08; F16H 5/66; G05D 17/02
[52] U.S. Cl. ............................. 364/424.1; 364/431.01; 74/866
[58] Field of Search ................ 364/424.1, 425, 431.11, 364/431.01; 74/866

[56] References Cited

U.S. PATENT DOCUMENTS

| | | | |
|---|---|---|---|
| 3,825,902 | 7/1974 | Brown et al. | 340/200 |
| 3,905,025 | 9/1975 | Davis et al. | 340/200 |
| 3,906,207 | 9/1975 | Rivere et al. | 364/425 |
| 4,008,567 | 2/1977 | Hirsch | 74/866 |
| 4,281,567 | 8/1981 | Maurer | 74/866 |
| 4,282,573 | 8/1981 | Imai et al. | 364/431.11 |
| 4,337,513 | 6/1982 | Furuhashi | 364/431.11 |
| 4,353,272 | 10/1982 | Schneider et al. | 74/866 |
| 4,355,360 | 10/1982 | Asano et al. | 364/431.11 |
| 4,482,962 | 11/1984 | Amano et al. | 364/431.11 |
| 4,507,986 | 4/1985 | Okamura et al. | 74/866 |
| 4,515,040 | 5/1985 | Takeuchi et al. | 74/866 |
| 4,546,673 | 10/1985 | Shigematsu et al. | 74/866 |
| 4,564,906 | 1/1986 | Stephan et al. | 364/424.1 |

FOREIGN PATENT DOCUMENTS

2061424 5/1981 United Kingdom ................ 364/442

Primary Examiner—Felix D. Gruber
Attorney, Agent, or Firm—Schwartz, Jeffery, Schwaab, Mack, Blumenthal & Evans

[57] ABSTRACT

A method of controlling a power train including an engine and a transmission wherein various input data are generated and among the various input data, a predetermined input data is common in controlling the engine and the transmission.

5 Claims, 7 Drawing Figures

POWER TRAIN CONTROL METHOD ON COMMON INPUT DATA

CROSS REFERENCES TO RELATED APPLICATIONS

The related applications are as follows:
(1) U.S. patent Application Ser. No. 678,889, filed by Akio HOSAKA on Dec. 6, 1984;
(2) U.S. patent application Ser. No. 678,886, filed by Akio HOSAKA on Dec. 6, 1984;
(3) U.S. patent application Ser. No. 680,786, filed by Akio HOSAKA et al on Dec. 12, 1984 (now U.S. Pat. No. 4,615,410);
(4) U.S. patent application Ser. No. 680,881, filed by Akio HOSAKA on Dec. 12, 1984;
(5) U.S. patent application Ser. No. 680,785, filed by Akio HOSAKA on Dec. 12, 1984;
(6) U.S. patent application Ser. No. 683,354, filed by Hitoshi TAKEDA on Dec. 19, 1984;
(7) U.S. patent application Ser. No. 698,377, filed by Hitoshi TAKEDA et al on Feb. 5, 1985;
(8) U.S. patent application Ser. No. 694,409, filed by Akio HOSAKA on Jan. 24, 1985.

BACKGROUND OF THE INVENTION

The present invention relates to a method of controlling a power train of an automotive vehicle. The term "power train" is used herein to mean a power generating and delivery system which includes an engine and a transmission.

The power train of this kind is used for example as a drive system of an automotive vehicle. Until recently, it has been the common practice in controlling the power train to control an engine in a discrete manner from controlling a transmission as reported for example in an SAE technical paper 830423 published by Society of Automotive Engineering (SAE). In controlling an engine, an engine controller receives, as basic data, an engine revolution speed and an intake air flow rate, performs computations on these input data, and generates output data resulting from the computations in order to adjust fuel supply, ignition timing, exhaust gas recirculation rate, and intake air flow rate to optimal values, respectively. In controlling a transmission, a transmission controller receives, as basic input data, a vehicle speed and an engine load, performs computation on these input data, and generates output data resulting from the computations in order to shift the transmission to an optimal reduction ratio (a gear position) and adjust a slip in a torque converter to an optimal level. In controlling the engine, there are cases where an intake manifold vacuum or an intake pipe absolute pressure is used as an input data.

However, according to the control method as mentioned above, the input data for use in controlling the engine are different from the input data for use in controlling the transmission, and thus the engine and the transmission do not operate on integrated input data. Thus, when a plurality of means for generating input data, such as sensors, have less uniform characteristics or they age in different manners, the varying tendency of control characteristics of the engine and that of the transmission which are dependent upon the characteristics of the means are not uniform and less close with each other. In this case, since the engine control characteristics and the transmission control characteristics are not matched, even if variations in control characteristics of the engine and variations in control characteristics of the transmission are not substantially large, respectively, the fuel economy and the power performance of the power train as a whole are deteriorated greatly, resulting in a great deterioration in performance as compared to the initial performance. With the conventional control method, however, there are limits to enhancing or improving the control characteristics of the power train as a whole.

SUMMARY OF THE INVENTION

An object of the present invention is to provide a method of controlling a power train wherein the matching in control characteristics between an engine and a transmission is less disturbed even if means for generating input data have less uniform characteristics and age in different manners.

According to the present invention, there is provided a method of controlling a power train of an automotive vehicle, the power train including an engine and a transmission, the method comprising:
generating a plurality of input data including at least one predetermined input data;
controlling the engine on a portion of the input data, the portion including the predetermined input data; and
controlling the transmission on another portion of the input data, the another portion including the predetermined data, whereby the predetermined input data is common in controlling the engine and the transmission.

DETAILED DESCRIPTION OF THE INVENTION

Hereinafter, the present invention is described in detail based on an illustrated embodiment.

Figure 1:
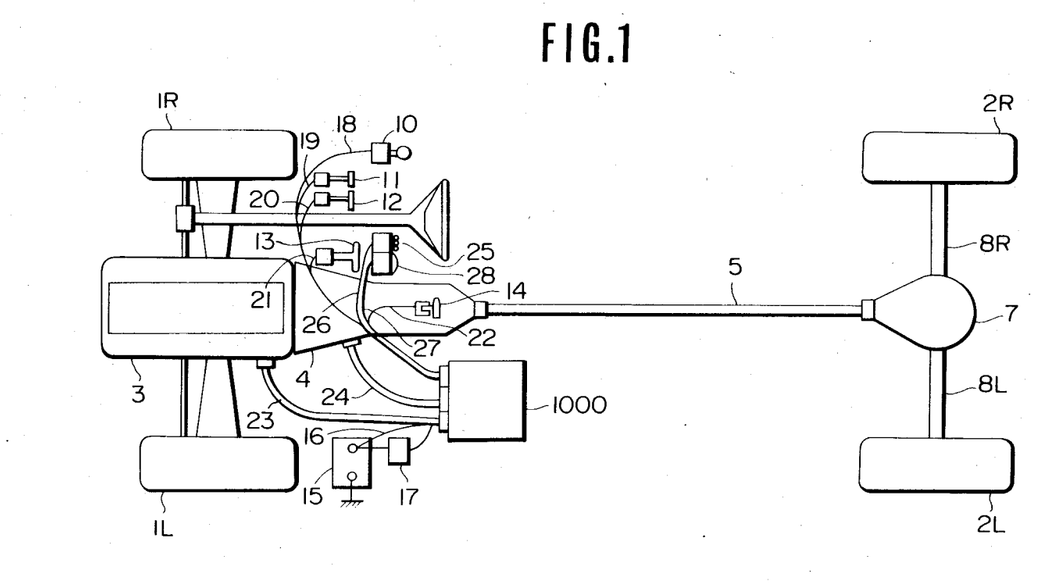
FIG. 1 is a plan view of an automotive vehicle illustrating a control system for carrying out a method according to the present invention.

Referring to FIG. 1, there is shown one example of a control system for carrying out a method according to the present invention together with a power train of an automotive vehicle which is to be controlled. In the Figure, 1L, 1R designate left and right front wheels, respectively, 2L, 2R designate left and right rear wheels, 3 designates an engine, 4 designates a transmission (automatic transmission), 5 designates a propeller shaft, 7 designates a differential gear, 8L, 8R designate left and right rear axles. The front wheels 1L, 1R designate change direction wheels which are controlled by a steering wheel 9 to change direction of the automotive vehicle. The rear wheels 2L, 2R are driving wheels of the automotive vehicle which receive the output of the engine 3 that is delivered via the transmission 4, propeller shaft 5, differential gear 7 and axles 8L, 8R.

The start, operation and stop of the engine 3 are subject to control by an ignition switch 10. The engine 3 can increase its output as the accelerator pedal 11 is depressed. The output of the engine 3 is delivered in the above mentioned delivery path to the rear wheels 2L, 2R, enabling the vehicle to run. The vehicle can be stopped by depressing a brake pedal 12 and parked by manipulating a parking brake 13.

The transmission 4, which forms together with the engine 3 a power train to be controlled by the method according to the present invention, is rendered to establish a selected power delivery path in response to a manipulated position assumed by a select lever 14, such as a parking (P) range, a reverse (R) range, a neutral (N) range, a forward automatic drive (D) range, a manual second (II) brake range or a manual first (I) brake range and delivers the power from the engine 3 to the propeller shaft 5 with a selected gear position in a selected one of the drive ranges R, D, II and I.

The power train control system for carrying out the method according to the present invention comprises a control unit 1000 which is common to the engine 3 and the transmission 4. This control unit is always supplied via an electric path 16 with an electric power which serves as a direct continuously connected electric power source from a vehicle battery 15 and it operates on an electric power from the vehicle battery 15 which is supplied thereto as a main power source via a power source relay 17 that is closed when the ignition switch 10 is turned ON. Although they are described later, those signals are fed to the control unit 1000 and include a signal from the ignition switch 10 via an electric path 18, a signal from the accelerator pedal 11 via an electric path 19, a signal from the brake pedal 12 via an electric path 20, a signal from the parking brake lever 13 via an electric path 21, a signal from the select lever 14 via an electric path 22, signals indicative of a crank angle of the engine 3, a crankshaft torque, an intake air flow rate and a temperature via a wire harness 23, and signals indicative of an output shaft revolution speed of the transmission 4 and an output shaft torque thereof via a wire harness 24. Based on these input signals arithmetic operations are performed and the results are fed via the wire harneses 23, 24 to the engine 3 and the transmission 4, respectively, thereby to control them. The control unit 1000 is also supplied via an electric path 26 with data inptu signals from a data input device 25 manually operable by a driver, and alters its operation mode depending on these data input signals and feeds various kinds of data via an electric path 27 to a display 28 where the data are displayed.

Figure 2:
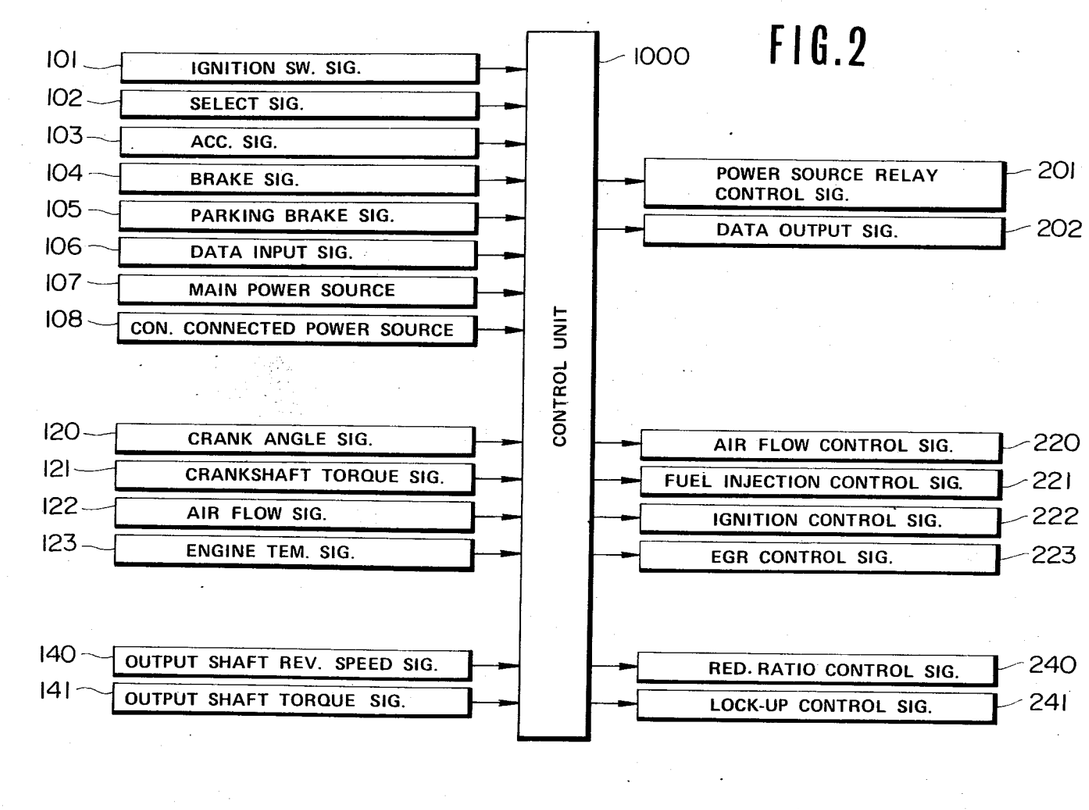
FIG. 2 is a block diagram illustrating a control unit with its various input and output signals.

Referring to FIG. 2, these input and output signals to and from the control unit 1000 are described in detail one after another. Among the input signals, an ignition switch signal 101 is indicative of which one of the operating positions the ignition switch 10 assumes including a LOCK position, an OFF position, an ACCESSORY position, an ON position, and a START position, and it is fed to the control unit 1000 via the electric path 18. Since the functions performed when the ignition switch 10 assumes these operating positions are well known, the description is omitted. A select signal 102 is indicative of which one of the before mentioned drive ranges P, R, N, D, II, I is selected via the electric path 28. An accelerator signal 103 which is a voltage signal variable in proportion to the depression degree of the accelerator pedal 11 is obtained by a potentiometer and fed to the control unit 1000 via the electric path 19. A brake signal 104 which is a voltage signal variable in proportion to the depression degree of the accelerator pedal 11 is obtained by a potentiometer and fed to the control unit 1000 via the electric path 19. A brake signal 104 which is a voltage signal variable in proportion to the depression degree of the brake pedal 12 is obtained by a potentiometer like and fed to the control unit 1000 via the electric path 20. A parking brake signal 105 is obtained by a potentiometer and the like that is movable with the parking brake lever 13, which signal is a voltage signal variable in proportion to an operating position of the parking brake lever 13 and fed to the control unit 1000 via the electric path 21. Instead, the brake signal 104 and the parking brake signal 105 may be obtained by pressure sensors, each responsive to a bias force (a braking force) of a brake element. The signals 103, 104 and 105, although they were described previously as analog signals, may take the digital form by using encoders and the like.

A data input signal 106 is a signal from a key board of the data input device 25 or a switch and fed to the control unit 1000 via the electric path 26. The data input signal 106 specifies one of the operation modes of the control unit 1000, for example a control operation mode and a self-checking mode or a power mode and a fuel economy mode. The main power source 107 is fed to the control unit 1000 via the power source relay 17 from the vehicle battery 15. The continuously connected power source 108 is always fed to the control unit 1000 via the electric path 16 from the battery 15.

A crank angle signal 120 is a pulse signal which is generated each time after the engine crankshaft has turned through a predetermined angular angle, which signal is fed to the control unit 1000 via the wire harness 23. This signal is generated by a photoelectric detector which detects a light passing through a slit plate, i.e., a disc rotatable with the crankshaft and formed with equiangularly distant slits. A crankshaft torque signal 121 is a voltage signal variable in proportion to the torque impressed on the crankshaft, the torque being detected using the piezoelectric effect. This signal is fed to the control unit 1000 via the wire harness 23. The air flow signal 122 is a signal variable in inverse proportion to the intake air flow rate admitted to the engine, and it is fed to the control unit 1000 via the wire harness 32. This signal is obtained by an air flow meter usually used in a fuel injection type engine. An engine temperature signal 123 is a signal variable in proportion to a coolant temperature of the engine 3, which signal is fed to the control unit 1000 via the wire harness 23. This signal is obtained by a thermistor which is sensitive to the temperature of an engine coolant.

An output shaft revolution speed signal 140 is a signal variable in proportion to the revolution speed of the output shaft of the transmission 4, which signal is fed to the control unit 1000 via a wire harness 24. This signal can be obtained by computing on a cycle or a frequency of a pulse signal that is generated by a similar means used to generate the crank angle signal 120. The output shaft torque signal 141 is a voltage signal which is proportional to the output shaft torque of the transmission 4, which signal is fed to the control unit 1000 via the wire harness 24. This signal can be generated by a similar torque sensor used to generate the crankshaft torque signal 121.

Hereinafter, output signals are described. The power source relay control signal 201 is provided to effect ON/OFF control of the power source relay 17 such that when the engine is in operation where the ignition switch 10 is placed to ON or START position, the power source relay 17 is turned ON, connecting the main power source 107 from the battery 15 via this power source relay 17 to the control unit 1000, and the power source relay 17 is kept closed even after the ignition switch 10 has been turned OFF until saving of the data is completed, keeping the connection of the main power source 107 to the control unit 1000. The data output signal 202 is delivered via the electric path 27 to the display 28, causing same to display a reduction ratio established in the transmission 4, a range selected by the select lever 14, and a result of dyagnosis of the power train control system.

An air flow control signal 220 contains an instruction that is responsive to the accelerator signal 103 and is supplied via the wire harness 23 to the well known throttle actuator mounted to the engine 3, causing the throttle actuator to adjust the throttle opening degree to a level corresponding to the depression degree information (accelerator signal 103) of the accelerator pedal 11, thereby to adjust the air flow rate admitted to the engine 3 to a value corresponding to the air flow control signal 220. The air flow control signal 220 adjusts the throttle opening degree via the throttle actuator so as to keep the idle revolution constant. When the data input signal 106 instructs a constant speed crusing, the air flow control signal 220 adjusts via the throttle actuator the throttle opening degree as a result of comparison of a measured vehicle speed with an instructed vehicle speed value (a feedback control) in order to cause the vehicle to run at the instructed vehicle speed value. The fuel injection control signal 221 is a pulse signal which controls the opening time of a fuel injection valve mounted on the engine, which signal is delivered from the control unit 1000 via the wire harness 23. The basic control concept is that the above mentioned valve opening time duration (fuel injection amount), which is proportional to the intake air flow rate, is computed on the crank angle signal 120 and the air flow signal 122, and then this result is corrected in various manners, and the result is output in terms of the fuel injection control signal 221 in synchronous with the operation of the engine 3. The ignition control signal 222 is a signal which controls the ignition energy and the ignition timing by controlling in synchronism with the crank angle signal 120, the time during which current is allowed to pass through a primary coil of an ignition coil provided to the engine 3 and the termination timing of the current supply. This signal is delivered from the control unit 1000 via the wire harness 23. The ignition energy is controlled such that it is kept unchanged with a variation in the engine revolution speed (the cycle or the frequency of the crank angle signal 120) and a variation in the voltage of the battery 15, and the ignition timing is determined from the engine revolution speed and crankshaft torque taking the output torque, fuel economy and exhaust gases into account. The basic ignition timing obtained as described above is subject to corrections depending on engine temperature and various operating states. The ignition control signal 222 is generated in synchronous with the engine under the control of the crank angle signal 120. The EGR control signal 223 is a signal relating to the opening degree of an exhaust gas recirculation valve (exhaust gas recirculation rate), which signal is delivered from the control unit 1000 via the wire harness 23. The EGR valve opening as mentioned above is determined on the engine revolution speed and the crankshaft torque taking the exhaust gas and fuel economy into account.

A reduction ratio control signal 240 is a signal corresponding to a reduction ratio (gear position) established in the transmission 4 and delivered from the control unit 1000 via the wire harness 24. The reduction ratio is determined on the input torque to the transmission (the engine crankshaft torque), i.e., the signal 121, and the vehicle speed (output shaft revolution speed signal 140) taking the driving torque and fuel economy vibrations into account. The reduction ratio control signal 240 controls various kinds of shift solenoids of the transmission 4 in order to establish the desired gear position. The lock-up control signal 241 is a signal which controls connection and disconnection between the input and output elements of the torque converter in the transmission 4 and delivered from the control unit 1000 via the wire harness 24. The lock-up control signal 241 is determined on the crankshaft torque (signal 121) and the vehicle speed (signal 140) taking the fuel economy and vibrations into account, in order to effect the above mentioned connection/disconnection control by duty control of a lock-up solenoid so as to control a relative rotation (slip) between the input and output elements of the torque converter as desired.

Figure 3:
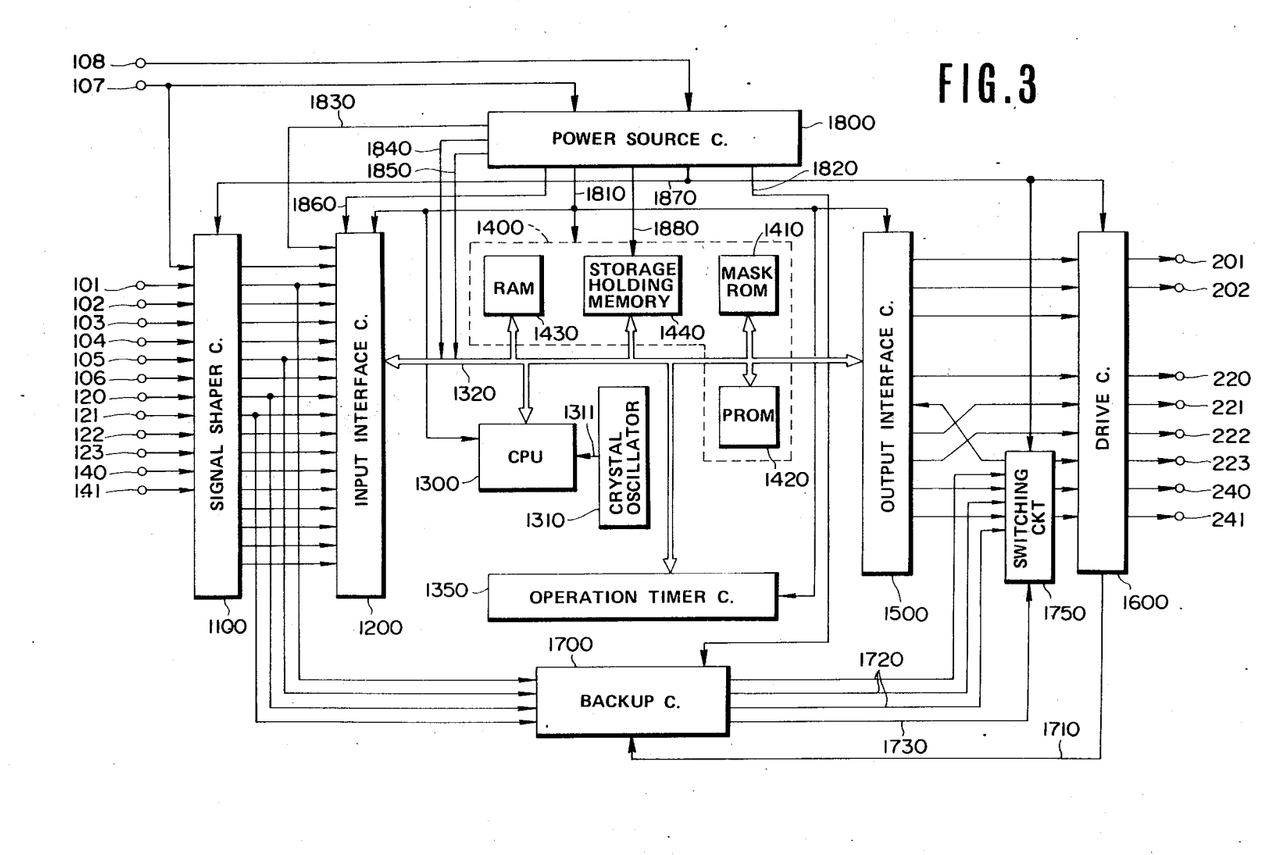
FIG. 3 is a detailed block diagram of the control unit.

Hereinafter, referring to FIG. 3, a practical example of the architecture of the control unit 1000 is described.

In this Figure, 1100 designates a signal shaper circuit which forms an input portion of the before mentioned various input signals 101 to 107, 120 to 123, 140, 141. It functions to eliminate noise of these input signals and absorbs a surge thereof so as to prevent mulfunction of the control unit 1000 caused by the noise and destruction thereof caused by the surge, and it also performs amplification of the various input signals and conversion thereof so as to shape these signals, thereby to allow an input interface circuit 1200 to perform an accurate operation. The input interface circuit 1200 effects analog to digital (A/D) conversion of the various input signals which have been shaped by the circuit 1100, counts pulses for a predetermined time, converts these signals into digital coded signals which can be read as input data by a central processing unit (CPU) 1300 and stores them into the corresponding internal registers. The CPU 1300 operates in synchronous with a clock signal generated based on an oscillating signal generated by a crystal oscillator 1310. The CPU 1300 is connected via a bus 1320 to the input interface circuit 1200, a memory 1400, an output interface circuit 1500 and an operation timer circuit 1350. When, in operation, it executes a control program stored in a mask ROM 1410 and a PROM 1420 of the memory 1400, the CPU 1300 reads various input data from the corresponding registers within the input interface circuit 1200, performs arithmetic operations on these input data to generate various output data, delivers these output data to the corresponding registers within the output interface circuit 1500 with a predetermined timing. The memory 1400 is a storage device including in addition to the above mentioned mask ROM 1410 and the PROM 1420, a RAM 1430 and a storage holding memory 1440. The mask ROM 1410 is used to permanently store control programs and data used in executing the programs. The PROM 1420 is used to permanently store vehicle speed values, control programs which are subject to alteration depending upon the engine 3 and the transmission in terms of their kinds, which data are written into the PROM 1420 when the latter is installed in the control system. The RAM 1430 is a random access memory which is able to read and write data and used to temporarily store intermediate data resulting from arithmetic operations performed by the CPU 1300, and temporarily store the final data resulting from the arithmetic operations executed by the CPU 1300 before they are delivered to the output interface circuit 1500. The storage contents immediately disappear when the main power source 107 is disconnected when the ignition switch 10 is turned OFF. The storage holding memory 1440 is used to store such data as those intermediate data and final data of the arithmetic operations executed by the CPU 1300 which are to be held even after the automotive vehicle stops its operation, and it can hold the above mentioned data owing to the continuously connected power source 108 even after the main power source 107 is disconnected when the ignition switch 10 is turned OFF.

The operation timer circuit 1350 is provided to reinforce the facilities of the CPU 1300. It comprises a multiplication circuit for speeding up processing in the CPU 1300, an interval timer for causing an interrupt signal upon elapse of a predetermined time and a free-running counter used for measuring a time elapsed in the CPU 1300 for effecting a shift from a predetermined event to a next event and mesuring the instant when the event takes place. The output interface circuit 1500 stores the output data from the CPU 1300 into the corresponding internal registers. It converts these data into pulse signals or into switching signals which go into "1" or "0" before delivering them to a drive circuit 1600. The drive circuit 1600 is a power amplifier circuit which performs voltage or current amplification of the signals from the output interface circuit 1500 so as to produce the before mentioned various output signals 201, 202, 220 to 223, 240, 241.

Designated by 1700 is a backup circuit which is activated by a monitor signal 1710 caused by monitoring the signals produced by the drive circuit 1600. When it is activated indicating that the CPU 1300 or the memory 1400 has failed to normally operate due to trouble, the backup circuit 1700 receives a portion of the signals from the signal shaper circuit 1100 and generates output signals which enables the engine 3 and the transmission 4 to continue to operate such that the automotive vehicle can continue its running and also a switching signal 1730 informing the occurence of a trouble. The signals 1720 and 1730 are supplied to a switching circuit 1750, causing the switching circuit 1750 to cut off signals from the output interface circuit 1500 and supply in lieu thereof the signals 1720 from the backup circuit 1700 to the drive circuit 1600, thereby to enable the automotive vehicle to safely run to an auto repair shop.

Designated by 1800 is a power source circuit which is supplied with the main power source 107 and the continuously connected power source 108. The power source circuit 1800 supplies a constant voltage 1810 of 5 V from the main power source 107 to the input interface circuit 1200, CPU 1300, memory 1400, output interface circuit 1500 and operation timer circuit 1350. It also supplies another constant voltage 1820 of 5 V to the backup circuit 1700, a signal 1830 indicative of "ON" or "OFF" state of the ignition switch 10 to the input interface circuit 1200, a reset signal 1840 and a stop signal 1850 for stopping the operation of the CPU 1300 to the bus 1320, a constant voltage 1860 for the internal A/D converter to the input interface circuit 1200, and a main voltage 1870 to the signal shaper circuit 1100, drive circuit 1600 and switching circuit 1750. In addition, the power source circuit 1800 supplies a constant voltage 1800 of 5 V from the continuously connected power source 108 to the storage holding memory 1440 for enabling same to operate even after the ignition switch 10 has been turned OFF.

Figure 4:
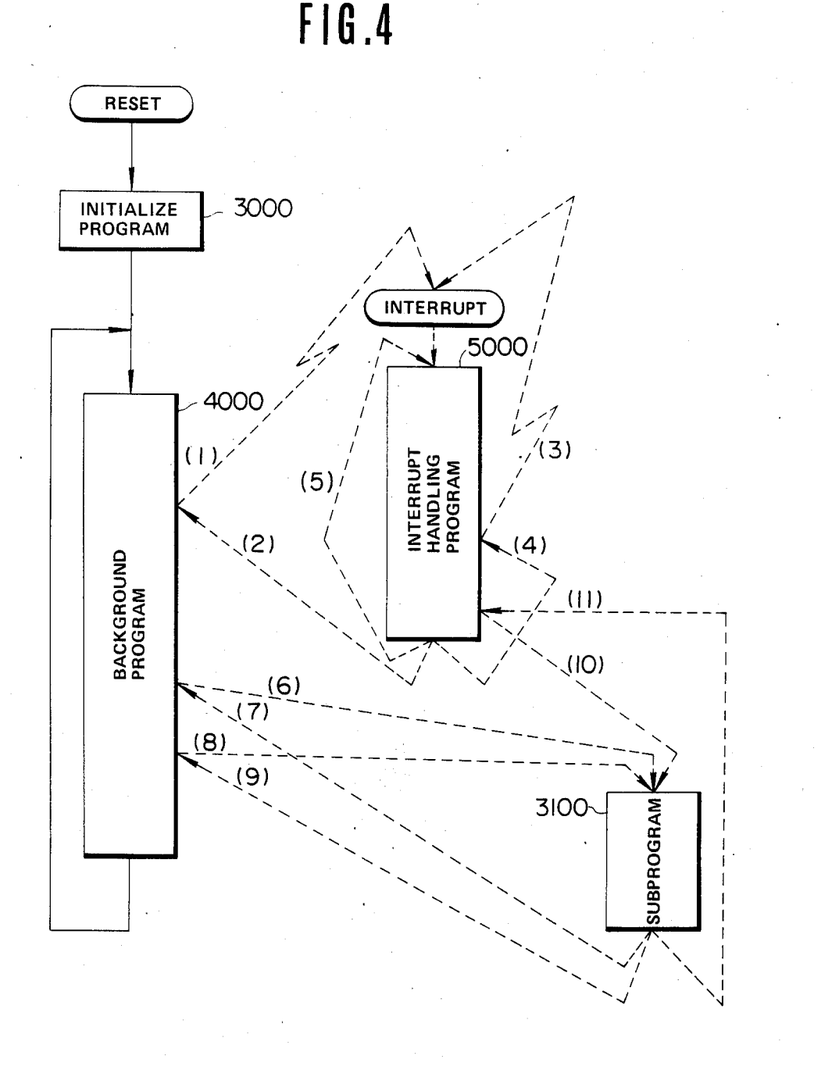
FIG. 4 illustrates a control concept carried out by the control unit.

Referring to FIG. 4, control programs for the control unit of the above construction and processing thereby are generally described.

The control programs comprise and can be generally devided into four groups, i.e., an initialize program 3000, a background program group 4000, an interrupt handling program group 5000 and a subprogram group 3100.

When the ignition switch 10 is turned ON and thus the main power source 107 is connected, the reset signal 1840 is generated by the power source circuit 1800, causing the control programs to be initiated to run from a RESET shown in FIG. 4. First, the initialize program 3000 is caused to run so as to set initial values in the RAM 1430, input and output interface circuits 1200, 1500 (initialization). After the initialization, the execution of the background program 4000 is caused and repeated. This program group comprises a plurality of programs listed in the corresponding items and these listed programs are caused to run sequentially in the order of arrangement of the items. Entry of an interruption signal causes an interruption if it occurs during the execution of the background program 4000, causing switching along a path as indicated by a broken arrow (1) to the interrupt handling program group 5000 which begins with INTERRUPT. (Although not so in this embodiment, the interruption of the initialize program 3000 may be possible if so desired.)

After identifying the interrupt signal, the program group 5000 selects one of a plurality of programs therein in response to the identified result and causes the selected program to run. After execution of the selected program, switching back to the interrupted portion of the background program group 4000 occurs along a path as indicated by a broken arrow (2), thus causing it to rerun.

If another new interruption signal enters during the execution of the interrupt handling program group 5000, switching to INTERRUPT along a path as indicated by a broken arrow (3) occurs, and a comparison is made between the interrupt handling program under execution and another interrupt handling program corresponding to the new interrupt signal so as to decide which one should be executed. In response to the decision result, one possibility is that the new interrupt signal causes switching to the new program corresponding to the new interrupt signal along a path as indicated by a broken line arrow (4) and after execution of this new program, the interrupted program is caused to rerun. Another possibility is that after executing the program under execution, switching occurs to the new program corresponding to the new interrupt signal along a path as indicated by a broken line arrow (5).

Among the plurality of programs belonging to the background program group 4000 and the plurality of programs belonging to the interrupt handling program group 5000, those which are frequently used are labelled as subprogram group 3100. When, during execution of a program belonging to the background program group 4000 or the interrupt handling program group 5000, a need for the above mentioned subprogram arises, switching to the subprogram 3100 occurs along a path indicated by a broken line arrow (6) or (8) or (10), causing the needed program therein to run. After the execution of this needed program, switching back to the interrupted program occurs along a path as indicated by a broken line arrow (7) or (9) or (11), causing it to rerun. Although it is possible to interrupt a subprogram under execution to cause another subprogram to be executed or to cause the interrupt handling program group 5000, this is not illustrated here in this Figure for the sake of avoiding complexity.

If an interruption of a program causes a problem, entry of such interruption can be prohibited before the execution of the program until the end of the execution.

Figure 5A:
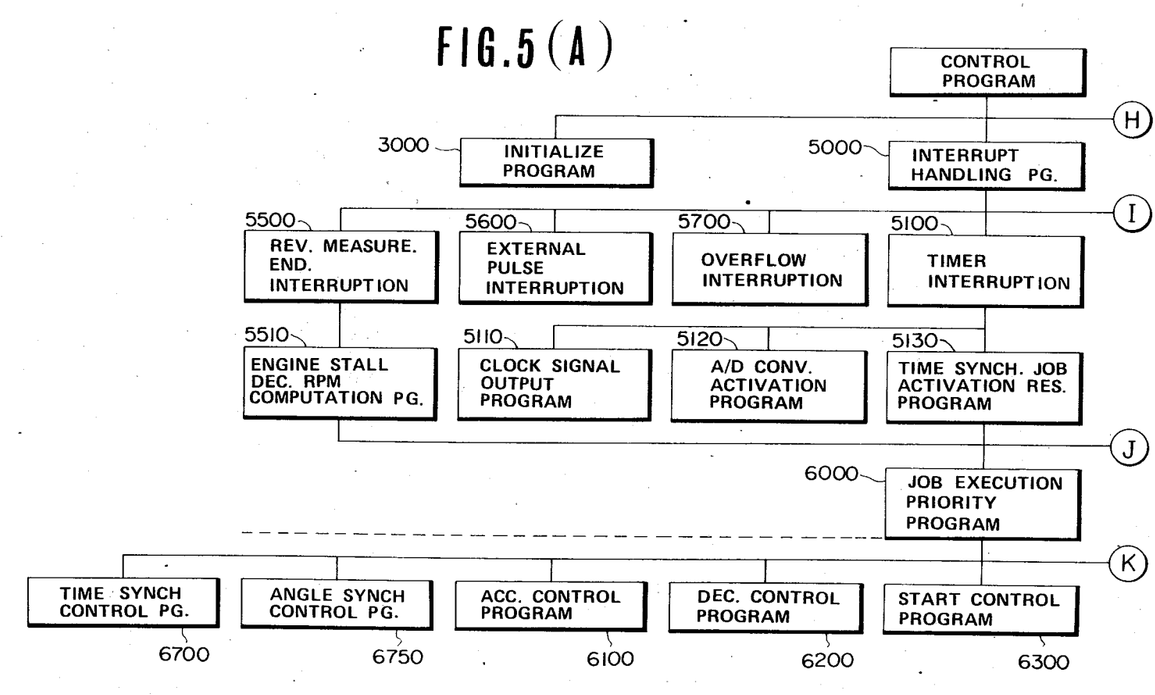
FIGS. 5(A) and 5(B), when combined, illustrate in detail the control relationship among programs stored in the control unit.
Figure 5B:
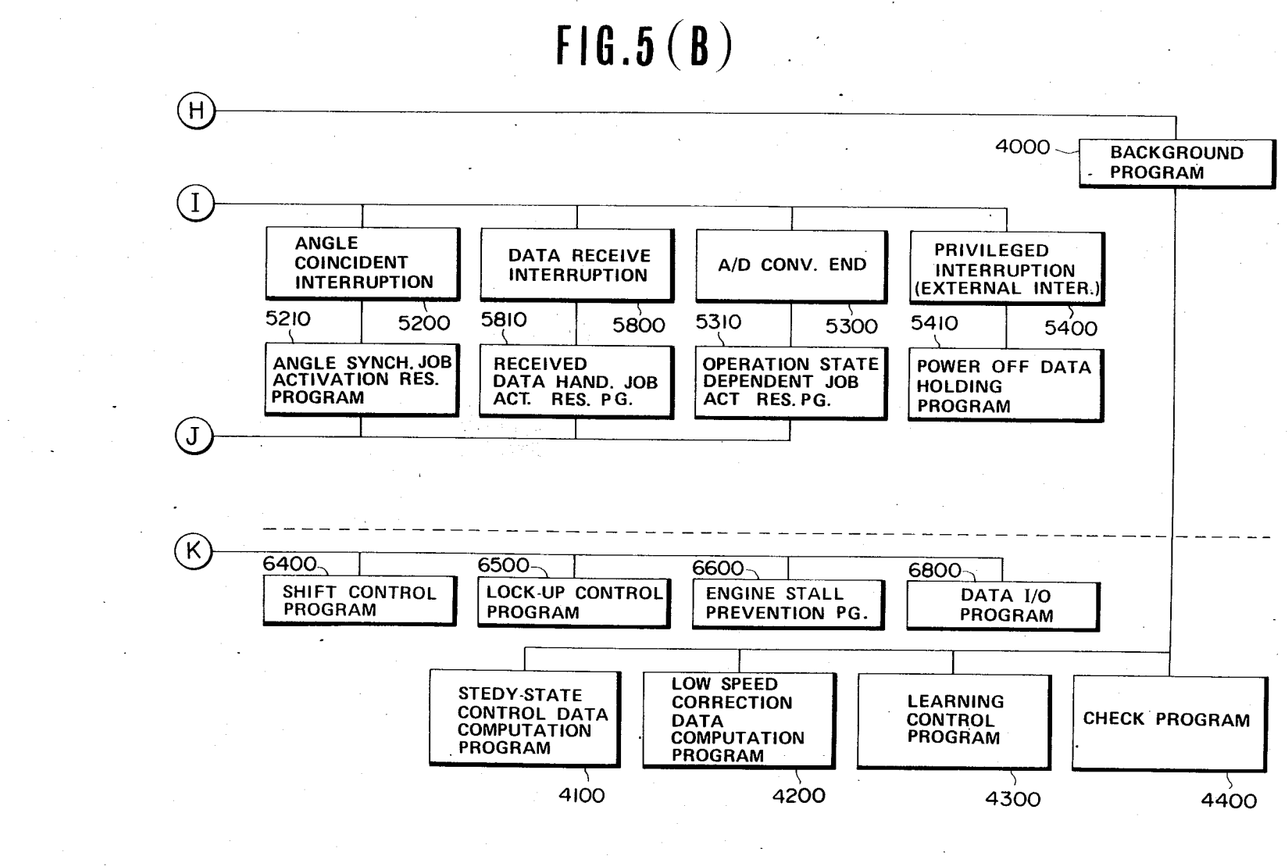

The detail of the control programs is illustrated in FIG. 5 which is hereinafter used in detail description of the control program.

When the ignition switch 10 is turned ON and the main power source 107 is connected, the reset signal 1840 is generated, causing the initialize program 3000 to run from a specified address called "reset vector address." The initialize program 3000 is executed to prepare arrangements for execution of various programs which follow by setting initial values in the CPU 1300, RAM 1430, input/output interface circuits 100, 1500 (initializing). With this program, all of the locations in the RAM to be used by this microcomputer are cleared and all of the instructions necessary for operation of the input and output interface circuits 1200, 1500 and the operation timer circuit 1350, and the operation thereof is initiated. These instructions include an instruction to release an instruction mask for handling interruption signals, an instruction to set frequency of timer interruption, an instruction to set a measuring time for measuring each of various revolution speeds and a vehicle speed, an instruction to set a constant or constants relating to each of output signal for one of various controls, and an instruction to set an initial state of each of the outputs. After initialization, an instruction authorizing an interruption is issued to the CPU 1300.

The execution of the background program 4000 continues during the normal operation of the CPU 1300, i.e., the operation of the CPU 1300 when there is no interruption requirement. With the background program group 4000, jobs which require less emergency are executed when the CPU 1300 is free, such as jobs requiring long operation time and jobs computing steady-state control constants. The background program group 4000 includes a steady-state control data computation program 4100, a low speed correction data computation program 4200, a learning control program 4300 and a check program 4400. These programs are executed sequentially in a predetermined order such that the top program is executed again after the execution of the bottom program and this cycle is repeated. In this manner, the control unit 1000 continues to generate the output signals 201, 202, 220 to 223, 240, 241 during the steady state operation of the automotive vehicle. The signals 220 to 223 are generated to control the engine 3 and the signals 240, 241 are generated for controlling the transmission 4 so as to adjust the engine 3 and the transmission 4 to the steady state operation of the automotive vehicle. The signal 201 is generated to hold the power source relay 17 in the ON state so as to keep connection to the main power source 107 and the signal 202 is generated to cause the display 28 to display necessary information.

The interrupt handling program group 5000 is caused to run by an interruption of the execution of the background program group 4000 (or the initialize program 3000 if desired). The interrupt handling program group 5000 includes a timer interrupt handling program 5100 (5110, 5120, 5130) an angle coincident interrupt handling program 5200 (5210), an A/D conversion handling program 5300 (5310), an external interruption (or a privileged interruption) handling program 5400 (5410), a revolution measurement end interruption handling program 5500 (5510), an external pulse interruption handling program 5600, an overflow interruption handling program 5700, and a data receive interruption handling program 5800 (5810) which are caused to be executed by the corresponding interruptions. It also includes a group of priority-basis-executing programs which are executed on priority which is decided by a job execution priority decision program 6000, which group of programs includes an acceleration control program 6100, a deceleration control program 6200, a start control program 6300, a shift control program 6400, a lock-up control program 6500, an engine stall prevention program 6600, a time synchronizing control program 6700, an angle synchronizing control program 6750 and a data input/output program 6800.

Describing these programs subsequently, entry of a timer interrupt causes a selection of the timer interruption program 5100 where the A/D conversion activation program 5120 is executed. This program 5120 manages the measurement of analog input signals by activating the A/D converter and switching the multiplexer in effecting the A/D conversion of the analog input signals for use in the subsequent control by switching the multiplexer. Then, the clock signal output program 5110 is executed. This program generates a clock signal with a predetermined cycle which indicates normal operation of each of the CPU 1300, memory 1400, output interface circuit 1500, and thus informs the operating state of each of them. Finally, time synchronizing job activation reservation program 5130 is executed and places an activation of a time synchronizing control program 6700 (i.e., an activation requirement of this program) in the job execution priority program 6000. The time synchronizing control program processes jobs to be carried out in synchronous with a cycle of the clock signal.

Entry of an angle coincidence interruption (i.e., an interruption which occurs whenever the engine assumes a predetermined crank angle) causes the selection of the angle coincident interruption handling program 5200. This program causes an angle synchronizing job activation reservation program 5210 to place the activation (i.e., the activation requirement) of a job handling program (an angle synchronizing control program 6750) which needs to be processed in synchronous with the revolution of the engine on the job execution priority decision program 6000.

Entry of an A/D BUSSY flag check interruption causes a selection of the A/D conversion end handling program 5300 where a decision is made on checking the A/D BUSSY flag whether or not the A/D conversion has ended. When it has ended, an operation state dependent job activation reservation program 5310 instructs the storage of A/D converted data into the corresponding location in the RAM 1430 in accordance with A/D conversion channel data, and although this will be specifically described later, it decides the operation state of the automotive vehicle on a time series data of the A/D converted values relating to the acceleration signal 103 and places the activation requirement of an appropriate operation state dependent job handling program for this operating state (such as the acceleration control program, deceleration control program and start control program) on the job execution priority decision program 6000.

Entry of an external interruption causes a selection of the external interruption handling program 5400. The external interruption, i.e., an emergency interruption, is generated when the main power source 107 is disconnected. The program 5400 is selected by entry of this interruption. This program 5400 causes the execution of a power off data holding program 5410 where data to be preserved for learning control and the like are moved from the RAM 1430 to the storage holding memory 1440.

Entry of engine revolution measurement end interruption causes a selection of the revolution measurement end interruption handling program 5500. According to this program, the activation of an engine stall decision RPM computation program 5510 is caused. This program 5510, where an engine revolution speed is read to decide whether or not the engine may stall, places an activation requirement of an engine stall prevention control program 6600 on the job execution priority program 6000 when the engine may stall.

The external pulse interruption handling program 5600 is caused to be executed upon manipulation of a key on a keyboard or entry of a pulse signal from an external device. This program causes execution of a corresponding control to the pulse signal. The overflow interruption handling program 5700 is caused to be executed by entry of an interruption which is generated upon overflow of the timer and performs a predetermined process.

The data receive interruption handling program 5800 is caused to be executed by entry of a data receive interruption and causes the execution of the received data handling job activation program 5810. With the execution of this program 5810, the received data is stored at a predetermined location in the RAM 1430 and then the activation of the received data handling job (i.e., the requirement for the activation thereof) is placed on the job execution priority program 6000.

The job execution priority decision program 6000 receives the various activation requirements of job handling programs selected by the above mentioned interrupt handling programs and causes the contents of the corresponding bits (flags) in the RAM 1430 to the selected job programs to go from "0" to "1". Since a predetermined execution priority level is originally allocated to each job program of all, the sequence of location and bit for each job program is determined in accordace with the predetermined priority level. In the case of this program, a check is made starting with the high-order bit sequentially down to the low-order bit in a location in the RAM 1430, and when a program is reserved, this program is executed and the reservation indicator is cancelled (by resetting the flag to "0"). When the execution of this program ends, the JOB execution priority decision program 6000 is executed and a reserved program of the next lower priority level is caused to be executed and the reservation therefor is cancelled, and after the execution of all of the reserved programs has ended, switching to the background program 4000 occurs.

Hereinafter, a group of those job programs which are to be executed on the priority determined by the program 6000 are described. The acceleration control program 6100 computes output control data relating to optimal fuel injection amount, ignition timing, exhaust gas recirculation flow rate, intake air flow rate, reduction ratio and lock-up schedule for the degree of acceleration. For example, in the case of a rapid acceleration (i.e., in the case of rapid increase in the accelerator signal 103), they are controlled such that for increasing the output of the engine, the fuel injection amount is increased, the ignition timing is advanced, the EGR flow rate is reduced and the intake air flow rate is increased, and in addition to increasing the output torque from the transmission 4, the lock-up of the torque converter is released and the reduction ratio is increased.

A deceleration control program 6200 computes, at deceleration, various control output data which are optimal for the degree of deceleration, vehicle speed and engine revolution speed. At deceleration, the engine 3 is controlled such that the fuel injection amount is zero or very small and the transmission 4 is controlled such that the reduction ratio and the operating state of the torque converter cooperate with each other to provide the most appropriate deceleration feel.

The start control program 6300 computes various output data for controlling the engine 3 and the transmission 4 such that a sufficiently great starting torque is obtained at the start of the automotive vehicle without causing any slip of the driving wheels 2L, 2R.

The shift control program 6400 computes various output data used for controlling the shift in the transmission 4 and the output torque and the revolution speed of the engine 3 in order to prevent substantial shocks from being transmitted to vehicle passengers during the shifting operation in the transmission 4.

The lock-up control program 6500 computes various output data for controlling lock-up operation of the torque converter and the output of the engine in order to reduce shocks occurring upon lock-up operation and release thereof.

The engine stall prevention control program 6600 is caused to be executed when it is anticipated that the engine stall tends to occur by deciding a state of variation in the engine revolution speed during the execution of said program 5510. It computes various control output data so as to control the engine 3 and the transmission 4 such that, for preventing the engine stall, the engine output is increased immediately and the load is decreased.

The time synchronizing control program 6700 which is reserved and executed after lapse of each cycle, updates various data and writes the control data of the preceding cycle into the output interface circuit 1500.

The execution of an angle synchronizing program 6750, which is reserved and executed whenever the engine 3 assumes a predetermined crank angle, updates various data and writes control data into the output interface circuit 1500.

The data input/output control program 6800, which is reserved and executed upon lapse of a predetermined time or upon entry of a data receive interruption, stores the data after deciding the content thereof upon data reception, alters the state of control and outputs of the content of the data upon effecting data transmission.

The operation of the above embodiment is further described in connection with that portion thereof which is related to the present invention.

The engine 3 and the transmission 4 are controlled by output data resulting from computation in the background program 4000 after completion of the initialize program 3000 and when the interruption program 5000 is not executed, i.e., when the execution of the background program 4000 is not interrupted by the above mentioned various interruptions. Describing the basic control of the engine 3 and the transmission 4, this is carried out by the steady-state control data computation program 4100 of the background program 4000. This program 4100 is executed along a flowchart shown in FIG. 6.

Figure 6:
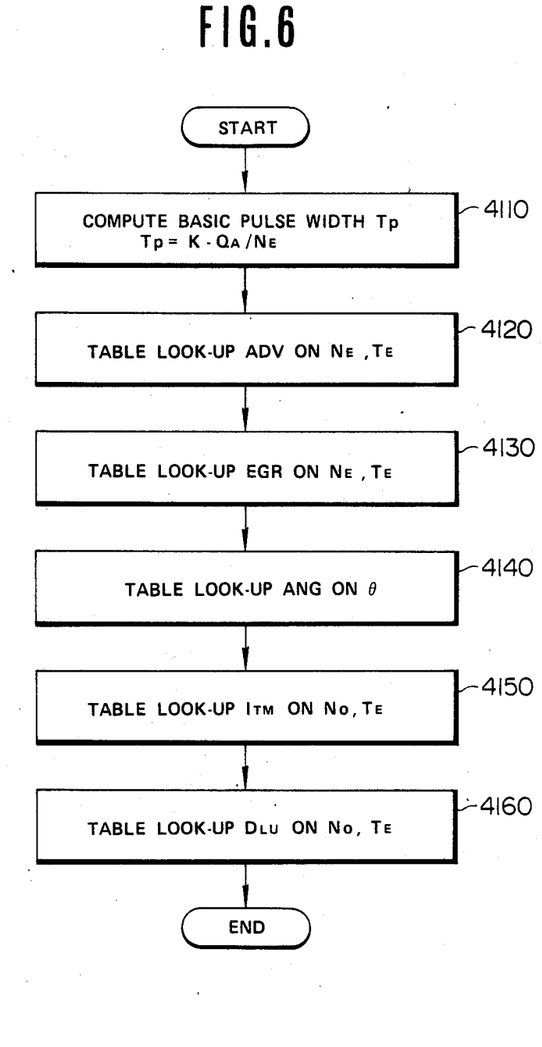
FIG. 6 is a flowchart of a steady-state data computation program.

Referring to FIG. 6, in a step 4110, the basic pulse width $T_P$ of a fuel injection pulse is computed from a constant K, an intake air flow rate $Q_A$ (signal 122) and an engine revolution speed $N_E$ (signal 120) using an equation $T_P = K \times Q_A / N_E$ so as to generate the fuel injection control signal 221 corresponding to the computation result. In the subsequent step 4120, a table look-up is carried out on the engine revolution speed $N_E$ and an engine output torque or a crankshaft torque $T_E$ (signal 121) to provide a basic ignition timing control data ADV and generate the ignition control signal 222 indicative of this data. In a step 4130, a table look-up is carried out on the engine revolution speed $N_E$ and the engine output torque $T_E$ to provide a basic rate data EGR and generate the EGR control signal 223 indicative of this data. In a step 4140, a table look-up is carried out on the depression degree $\theta$ (signal 103) of the accelerator pedal 11 to provide a basic throttle angle data ANG and generate the air flow control signal 220 indicative of this data. In a step 4150, a table look-up is carried out on an output shaft revolution speed $N_O$ (signal 140) of the transmission 4, i.e., a vehicle speed, and the engine output torque $T_E$ to provide a basic reduction ratio control data $T_{TM}$ and generate a reduction ratio control signal 240 indicative of this data. In a step 4160, a table look-up is carried out on the transmission output shaft revolution speed $N_O$ (vehicle speed) and the engine output torque $T_E$ to provide a basic lock-up duty data $D_{LV}$ and generate the lock-up control signal 241 indicative of this data. In the execution of each of the steps 4120, 4130, 4140, 4150 and 4160, an identical program (a two-dimensional table look-up subprogram) of the subprogram 3100 shown in FIG. 4 is employed although locations of table data used therein differ from one step to another.

As described before, the output signals 220, 221, 222 and 223 are used for the control of the engine 3. The air flow control signal 220 is used for adjusting via the throttle actuator the throttle opening degree to the value indicated by this signal, thus adjusting the intake air flow rate of the engine 3 to a value corresponding to the basic throttle angle data ANG. The fuel injection control signal 221 is used to adjust the valve opening duration of the fuel injection valve to the pulse with $T_p$, thus adjusting the fuel supply to the engine 3 accordingly. The ignition control signal 223 is used to adjust the ignition timing of the engine to the ADV data. The EGR control signal 223 is used to control the opening degree of the exhaust gas recirculation control valve such that the exhaust gas recirculation rate is adjusted to the data EGR. The reduction ratio control signal 240 is used to adjust the gear position of the transmission 4 to a ratio corresponding to the reduction ratio control data $I_{TM}$. The lock-up control signal 241 is used to effect ON/OFF control of the solenoid with a duty ratio corresponding to the data $D_{LV}$ so as to control the slip in the torque converter. With these signals 240, 241, the transmission 4 is controlled.

When one of the priority dependent job programs 6100, 6200, 6300, 6400, 6500, 6600 and 6800 has been executed after interruption, the operation coefficients and data to be used in the steady-state control data computation program 4100 are switched to new ones so that the subsequent execution proceeds on these new coeffecients and data. Thus, the signals 220 to 223 and 240, 241 are also altered to new ones corresponding to the new data and the engine 3 and the transmission 4 are controlled on these altered new signals.

It will now be understood that at least one control data, i.e., the engine output torque $T_E$ in the illustrated embodiment (crankshaft torque signal 121), is common in controlling the engine 3 and in controlling the transmission 4 so that the matching between the engine control and the transmission control is less disturbed even if the control data generating means has no uniform characteristics and ages in a different manner because such variations affect both the engine and the transmission.

In the illustrated embodiment, there are used as another input control data the engine revolution speed $N_E$ in the engine control and the output shaft revolution speed $N_O$ in the transmission control. These input data are not subject to variations in characteristics and aging and thus do not cause any disturbance of the matching between the engine control and transmission control because the revolution speed can be measured by using digital technique in terms of frequency or period. Therefore, what is to be used as a common input data should be a data which cannot be expressed except by an analog form.

What is claim is:

1. A method of controlling a power train of an automotive vehicle, the power train including an engine and a transmission operatively connected with the engine, the method comprising the steps of:
   generating a first plurality of input data signals including at least one predetermined input data signal representative of crankshaft torque data of said engine;
   generating an output data signal based on said first plurality of input data signals, said some of said plurality of input data signals including said at least one predetermined input data signal;
   controlling the engine with said output data signal;
   generating another output data signal based on a second plurality of input data signals, said second plurality of input data signals including said at least one predetermined input data signal; and
   controlling the transmission with said another output data signal, whereby said at least one predetermined input data signal is common in controlling the engine and the transmission.

2. A method of controlling a power train of an automotive vehicle, the power train including an engine and a transmission operatively connected with the engine, the method comprising the steps of:
   detecting an engine revolution speed of the engine and generating an engine revolution speed indicative signal;
   detecting an engine output torque of the engine and generating an engine output torque indicative signal;
   detecting an output shaft revolution speed and generating an output shaft revolution speed indicative signal;
   generating an engine control output data based on said engine revolution speed indicative signal and said engine output torque indicative signal;
   generating a transmission control output data based on said engine output torque indicative signal and said engine output revolution speed indicative signal;

controlling the engine based on said engine control output data; and controlling the transmission based on said transmission control output data.

3. A method as claimed in claim 2, wherein said engine control output data includes a basic ignition timing control data.

4. A method as claimed in claim 3, wherein said engine control output data includes a basic-EGR rate data.

5. A method as claimed in claim 2, wherein said transmission control output data incudes a basic reduction ratio control data.

* * * * *